(12) United States Patent
Barton

(10) Patent No.: US 9,961,400 B2
(45) Date of Patent: May 1, 2018

(54) REAL-TIME DVR PROGRAMMING

(71) Applicant: TiVo Solutions Inc., San Carlos, CA (US)

(72) Inventor: James M. Barton, Alviso, CA (US)

(73) Assignee: TiVo Solutions, Inc., San Jose, CA (US)

( * ) Notice: Subject to any disclaimer, the term of this patent is extended or adjusted under 35 U.S.C. 154(b) by 0 days. days.

(21) Appl. No.: 14/805,166

(22) Filed: Jul. 21, 2015

(65) Prior Publication Data

US 2015/0326924 A1   Nov. 12, 2015

Related U.S. Application Data

(63) Continuation of application No. 12/347,897, filed on Dec. 31, 2008, now Pat. No. 9,113,195.

(51) Int. Cl.
| | |
|---|---|
| *H04N 21/6543* | (2011.01) |
| *H04N 21/458* | (2011.01) |
| *H04N 21/435* | (2011.01) |
| *H04N 21/4147* | (2011.01) |
| *H04N 21/433* | (2011.01) |
| *H04N 21/81* | (2011.01) |
| *H04N 21/488* | (2011.01) |

(Continued)

(52) U.S. Cl.
CPC ......... *H04N 21/458* (2013.01); *H04N 21/237* (2013.01); *H04N 21/4147* (2013.01); *H04N 21/4302* (2013.01); *H04N 21/435* (2013.01); *H04N 21/4334* (2013.01); *H04N 21/4586* (2013.01); *H04N 21/47214* (2013.01); *H04N 21/4882* (2013.01); *H04N 21/6543* (2013.01); *H04N 21/8126* (2013.01); *H04N 21/4126* (2013.01); *H04N 21/4135* (2013.01)

(58) Field of Classification Search
None
See application file for complete search history.

(56) References Cited

U.S. PATENT DOCUMENTS 6,642,939 B1 * 11/2003 Vallone ............... G06F 11/1417
                                                           348/E5.105
6,714,793 B1    3/2004 Carey et al.
(Continued)

FOREIGN PATENT DOCUMENTS

| JP | 2004-193920 | 7/2007 |
|---|---|---|
| WO | WO 01/53963 | 7/2001 |

OTHER PUBLICATIONS

U.S. Appl. No. 12/190,519, filed Aug. 12, 2008, Office Action, dated Oct. 4, 2012.

(Continued)

*Primary Examiner* — Nathan Flynn
*Assistant Examiner* — Christine Kurien
(74) *Attorney, Agent, or Firm* — Haley Guiliano LLP

(57) ABSTRACT

Techniques for real-time DVR programming employ secure instant message protocol in a DVR environment. An embodiment sends an instant message to the DVR which causes the DVR to open a new secure connection with the service provider for synchronizing data on the DVR with updated programming data from the service provider. Another embodiment uses an already established connection with an instant message server for synchronizing data on the DVR with updated programming data from the service provider.

27 Claims, 7 Drawing Sheets

(51) Int. Cl.
*H04N 21/472* (2011.01)
*H04N 21/237* (2011.01)
*H04N 21/43* (2011.01)
*H04N 21/41* (2011.01)

(56) References Cited

U.S. PATENT DOCUMENTS

| | | | |
|---|---|---|---|
| 6,925,567 | B1* | 8/2005 | Hirata ............... H04L 63/0442 380/239 |
| 7,689,697 | B2* | 3/2010 | Chiba ............... H04L 67/025 709/203 |
| 7,870,264 | B2 | 1/2011 | Clark et al. |
| 7,877,765 | B2 | 1/2011 | Bhogal et al. |
| 7,933,950 | B1 | 4/2011 | Barton et al. |
| 8,707,376 | B1 | 4/2014 | Hannum et al. |
| 8,818,179 | B1 | 8/2014 | Barton |
| 9,113,195 | B1 | 8/2015 | Barton |
| 9,271,040 | B2 | 2/2016 | Barton |
| 2002/0083459 | A1 | 6/2002 | Kondo et al. |
| 2002/0174430 | A1 | 11/2002 | Ellis et al. |
| 2003/0118014 | A1 | 6/2003 | Ravishankar et al. |
| 2003/0145323 | A1 | 7/2003 | Hendricks et al. |
| 2004/0015989 | A1* | 1/2004 | Kaizu ............... G11B 15/023 725/39 |
| 2004/0078817 | A1 | 4/2004 | Horowitz et al. |
| 2004/0117483 | A1 | 6/2004 | Singer et al. |
| 2004/0185830 | A1 | 9/2004 | Joao et al. |
| 2004/0237100 | A1 | 11/2004 | Pinder et al. |
| 2004/0261093 | A1 | 12/2004 | Rebaud et al. |
| 2005/0066362 | A1 | 3/2005 | Rambo |
| 2005/0076359 | A1 | 4/2005 | Pierson et al. |
| 2005/0108769 | A1 | 5/2005 | Arnold et al. |
| 2005/0149481 | A1 | 7/2005 | Hesselink et al. |
| 2005/0183143 | A1 | 8/2005 | Anderholm et al. |
| 2006/0064721 | A1 | 3/2006 | Del Val et al. |
| 2003/0440503 | | 6/2006 | Perkes |
| 2007/0033617 | A1 | 2/2007 | Bloebaum |
| 2007/0061724 | A1 | 3/2007 | Slothouber et al. |
| 2007/0078949 | A1 | 4/2007 | Washington et al. |
| 2007/0156805 | A1 | 7/2007 | Bristol et al. |
| 2007/0157237 | A1 | 7/2007 | Cordray et al. |
| 2007/0178888 | A1 | 8/2007 | Alfano et al. |
| 2007/0186269 | A1 | 8/2007 | Malik |
| 2007/0220279 | A1 | 9/2007 | Northcutt et al. |
| 2007/0255809 | A1* | 11/2007 | Chiba ............... H04L 67/025 709/219 |
| 2007/0263075 | A1 | 11/2007 | Nimri et al. |
| 2007/0276926 | A1 | 11/2007 | LaJoie et al. |
| 2007/0277201 | A1 | 11/2007 | Wong et al. |
| 2008/0002951 | A1 | 1/2008 | Russ et al. |
| 2008/0092168 | A1 | 4/2008 | Logan et al. |
| 2008/0109741 | A1 | 5/2008 | Messing et al. |
| 2008/0163330 | A1 | 7/2008 | Sparrell |
| 2008/0244704 | A1 | 10/2008 | Lotter et al. |
| 2008/0275820 | A1 | 11/2008 | Joao et al. |
| 2008/0294998 | A1 | 11/2008 | Pyhalammi et al. |
| 2008/0298268 | A1 | 12/2008 | Chiba et al. |
| 2009/0069051 | A1 | 3/2009 | Jain et al. |
| 2009/0163173 | A1 | 6/2009 | Williams |
| 2009/0172551 | A1 | 7/2009 | Kane et al. |
| 2009/0232473 | A1 | 9/2009 | Kendall et al. |
| 2009/0241160 | A1 | 9/2009 | Campagna et al. |
| 2009/0319603 | A1 | 12/2009 | Baldwin et al. |
| 2010/0031296 | A1* | 2/2010 | Elias ............... H04N 7/17318 725/54 |
| 2010/0071007 | A1 | 3/2010 | Meijer |
| 2010/0229197 | A1 | 9/2010 | Yi et al. |
| 2011/0179139 | A1 | 7/2011 | Starkenburg et al. |
| 2011/0283318 | A1 | 11/2011 | Seidel et al. |
| 2014/0137173 | A1 | 5/2014 | Barton et al. |
| 2016/0173920 | A1 | 6/2016 | Barton |

OTHER PUBLICATIONS

U.S. Appl. No. 12/347,897, filed Dec. 31, 2008, Office Action, dated Feb. 4, 2013.
U.S. Appl. No. 12/190,519, filed Aug. 12, 2008, Final Office Action, dated Jan. 30, 2013.
U.S. Appl. No. 12/270,493, filed Nov. 13, 2008, Office Action, dated Jul. 16, 2013.
U.S. Appl. No. 12/347,897, filed Dec. 31, 2013, Final Office Action, dated Jul. 26, 2013.
U.S. Appl. No. 12/190,519, filed Aug. 12, 2008, Notice of Allowance, dated Jul. 2, 2013.
U.S. Appl. No. 12/270,493, filed Nov. 13, 2008, Notice of Allowance, dated Apr. 17, 2014.
U.S. Appl. No. 14/159,212, filed Jan. 20, 2014, Office Action, dated Jun. 3, 2014.
U.S. Appl. No. 12/270,493, filed Nov. 13, 2008, Final Office Action, dated Jun. 25, 2012.
U.S. Appl. No. 12/270,493, filed Nov. 13, 2008, Office Action, dated Jan. 4, 2012.
U.S. Appl. No. 12/257,352, filed Oct. 23, 2008, Office Action, dated Feb. 14, 2013.
U.S. Appl. No. 12/257,352, filed Oct. 23, 2008, Final Office Action, dated Dec. 2, 2013.
U.S. Appl. No. 12/257,352, filed Oct. 23, 2008, Advisory Action, dated Mar. 26, 2014.
United States Patent and Trademark Office, U.S. Appl. No. 14/159,212, Final Office Action dated Jan. 7, 2015.
United States Patent and Trademark Office, U.S. Appl. No. 12/347,897, Notice of Allowance dated Apr. 15, 2015.
United States Patent and Trademark Office, U.S. Appl. No. 14/159,212, Non-Final Office Action dated Jun. 1, 2015.
Japanese Patent Office, Application No. 2007-543364, "Office Action" dated Nov. 15, 2011, 4 pages.
Japanese Patent Office, Application No. 2007-543364, Claims dated Nov. 2011, 9 pages.
Chinese Patent Office, Application No. 200580041645.9, "Notification of the Second Office Action" dated Nov. 24, 2011, 9 pages.
Chinese Patent Office, Application No. 200580041645.9, Claims dated Nov. 2011, 11 pages.
European Patent Office, Application No. 11182065.0, "Office Action" dated Dec. 16, 2011, 9 pages.
European Patent Office, Application No. 11182065.0, Claims dated Dec. 2011, 3 pages.
Bray, T. et al., Namespaces in XML 1.0 (Second Edition) downloaded from the Internet on Nov. 26, 2007 < http://www.w3.org/TR/REC-xml-names/> Aug. 16, 2006 (10 pages).
Bray, T. et al., Extensible Markup Language (XML) 1.0 (Fourth Edition) downloaded from the Internet on Nov. 26, 2007 < http://www.w3.org/TR/REC-xml/ > Sep. 29, 2006 (33 pages).
Day, M. et al., Instant Messaging/Presence Protocol Requirements downloaded from the Internet on Nov. 26, 2007 < ftp://ftp.isi.edu/in-notes/rfc2779.txt > Feb. 2000 (25 pages).
Saint-Andre, P., Extensible Messaging and Presence Protocol (XMPP): Core downloaded from the Internet on Nov. 26, 2007 < ftp://ftp.isi.edu/in-notes/rfc3920.txt > Oct. 2004 (85 pages).
Saint-Andre, P., Extensible Messaging and Presence Protocol (XMPP): Instant Messaging and Presence downloaded from the Internet on Nov. 26, 2007, 84 pages.
United States Patent and Trademark Office, U.S. Appl. No. 14/159,212, Notice of Allowance dated Oct. 20, 2015.
United States Patent and Trademark Office, U.S. Appl. No. 12/257,352, Final Office Action dated Aug. 14, 2015.
United States Patent and Trademark Office, U.S. Appl. No. 14/469,224, Non-Final Office Action dated Sep. 15, 2015.
United States Patent and Trademark Office, U.S. Appl. No. 15/049,446, Non-Final Office Action dated May 6, 2016.
United States Patent and Trademark Office, U.S. Appl. No. 12/257,352, Non-Final Office Action dated May 31, 2016.

(56) References Cited

OTHER PUBLICATIONS

United States Patent and Trademark Office, U.S. Appl. No. 14/469,224, Final Office Action dated Jun. 17, 2016.
United States Patent and Trademark Office, U.S. Appl. No. 14/469,224, Notice of Allowance dated Sep. 8, 2016.
United States Patent and Trademark Office, U.S. Appl. No. 15/049,446, Notice of Allowance dated Sep. 23, 2016.

* cited by examiner

REAL-TIME DVR PROGRAMMING

CROSS-REFERENCE TO RELATED APPLICATIONS

This application claims benefit as a Continuation of U.S. patent application Ser. No. 12/347,897, filed Dec. 31, 2008, under 35 U.S.C. § 120. The above-mentioned patent applications are assigned to the assignee of the present application and are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF TECHNOLOGY

The present invention relates to digital video recorders ("DVRs"). The invention relates more specifically to a real-time DVR usage and reporting system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The introduction of the Digital Video Recorder (DVR) to the consumer world has revolutionized the way viewers watch and record television programs. DVRs eliminate the complications of VCRs and the need for video tapes. DVRs record television programs on a hard drive that is capable of storing a large number of television programs. Because DVRs are usually box-like in shape, and are often found sitting on top of the television sets to which they are connected, DVRs typically are included in the broad category of devices now called "set-top boxes." Much like VCRs, DVRs receive one or more television signals as input from cables or satellite dishes, (or, in some cases, unlike VCRs, from broadband network connections) and also output television signals to a television set or other display.

At least one such DVR automatically records several television programs in advance of the time that a user will watch those television programs. After one or more television programs have been recorded and stored on a hard drive, the DVR presents, to the user, through the television set, a user interface that identifies the television programs which currently are available for viewing. This user interface comprises a menu that allows the user to select, using a remote control device for the DVR, one of the currently recorded television programs. In DVRs produced by TiVo Inc., this menu is often called the "now playing" menu.

After a user selects a recorded television program, the DVR plays the selected television program to the user by reading the appropriate digital recording from the hard drive and sending a corresponding signal to the television set. While the television program is being played to the user, the DVR also receives signals from the user's remote control. Through the remote control, a user may instruct the DVR to perform various operations relative to the television program. For example, the user may instruct the DVR to play the television program backward for a desired period of time ("rewind"). The user may play the television program forward with greater than usual speed ("fast forward"). The user may play the television program forward with slower than usual speed. The user may cause the currently displayed video frame of the television program to be displayed indefinitely ("pause"), or stop the playing of the television program entirely. In this manner, the user may temporally traverse the television program however the user likes.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EXAMPLE EMBODIMENTS

A method and apparatus for real-time DVR programming is described. In the following description, for the purposes of explanation, numerous details are set forth in order to provide a thorough understanding of the present invention. It will be apparent, however, that the present invention may be practiced without such details. In other instances, well-known structures and devices are shown in block diagram form in order to avoid unnecessarily obscuring the present invention.

Structural Overview

Figure 1A:
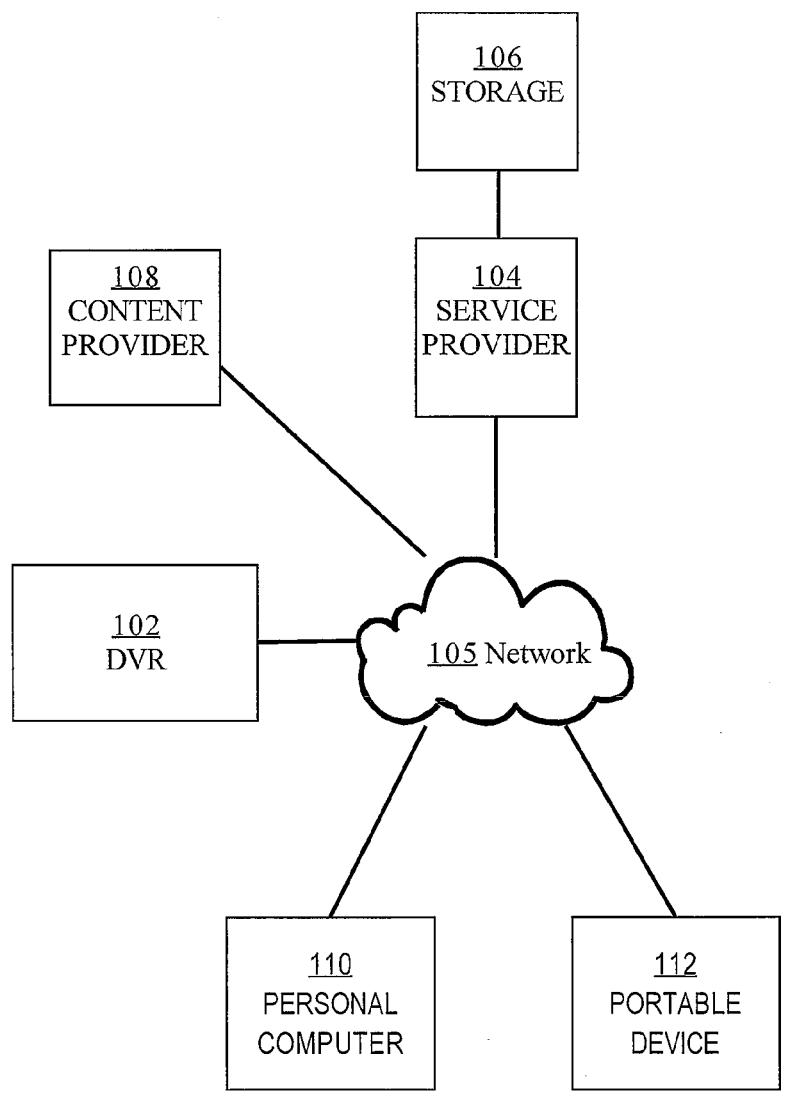
FIG. 1A is a block diagram illustrating a network with content and service providers for a DVR, according to a possible embodiment.

FIG. 1A illustrates a network with content and service providers for a DVR, according to a possible embodiment. The system comprises DVR 102 which is in communication with network 105 through any communication interface, such as an Ethernet interface or wireless communications port. The functionality of a DVR is typified in U.S. Pat. No. 6,233,389 which is owned by the Applicants and is hereby incorporated by reference. The system also includes service provider server ("service provider") 104, storage 106 for service provider 104, content provider 108, personal computer 110 and portable device 112.

Personal computer 110 may be a personal computing device, such as a desktop computer or laptop computer, and is also in communication with network 105 through any communications interface, including wireless. Portable device 112 may be any handheld computing device, cellular phone, portable media player, or any other portable device capable of displaying or playing multimedia content and is also in communication with network 105 through any communications interface, including wireless. DVR 102, personal computer 110, and portable device 112 each communicate as client with service provider server 104 through network 105. In a possible embodiment, DVR 102, personal computer 110, and portable device 112 each communicate with content provider 110 through network 105. Storage 106 may be internal to service provider 104 (not shown) or external to service provider 104 as shown.

Network 105 may be implemented by any medium or mechanism that provides for the exchange of data between devices in the communication system. Examples of network 105 include, without limitation, a network such as a Local Area Network (LAN), Wide Area Network (WAN), the Internet, one or more terrestrial, satellite, or wireless links, etc. Alternatively or additionally, any number of devices connected to network 105 may also be directly connected to each other through a communications link.

In a possible embodiment, content provider 108 provides broadcast program content to DVR 102 via cable, satellite, terrestrial communication, or other transmission method. Broadcast program content may include any multimedia content such as: audio, image, or video content. In a possible embodiment, content provider 108 provides multimedia content, such as any downloadable content, through network 105 to DVR 102, personal computer 110, or portable device 112.

In a possible embodiment, DVR 102 communicates with service provider 104 and storage 106, which provide program guide data, graphical resources (such as fonts, pictures, etc.), service information, software, advertisements, event identification data, and other forms of data that enable DVR 102 to operate independently of service provider 104 to satisfy user interests.

In a possible embodiment, content provider 108 may provide, to service provider 104, content data and/or any metadata, including promotional data, icons, web data, and other information. Service provider 104 may then interpret the metadata and provide the content data and/or metadata to DVR 102, personal computer 110, or portable device 112.

Figure 1B:
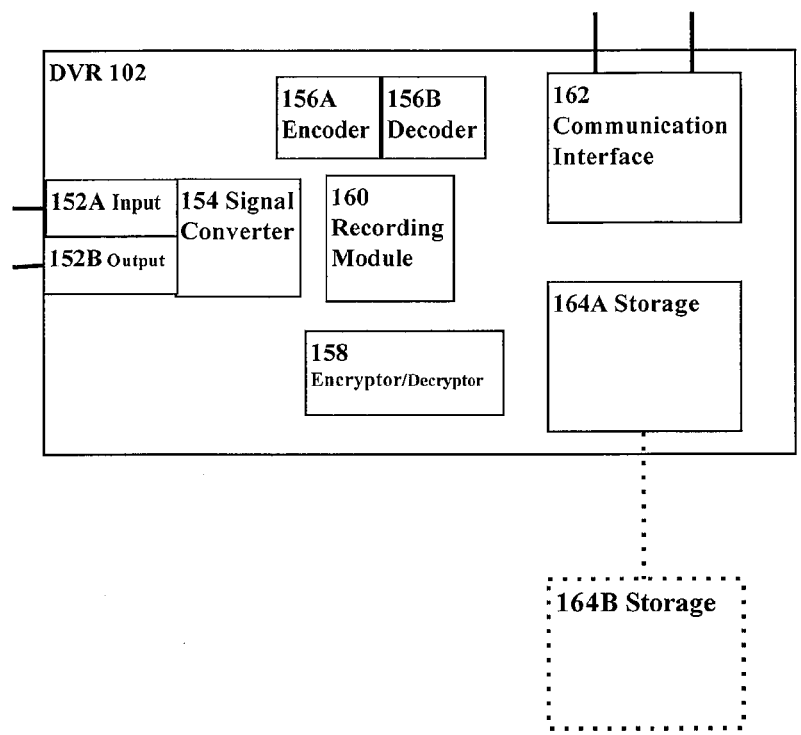
FIG. 1B is a block diagram illustrating a general overview of the components of a Digital Video Recorder (DVR), according to a possible embodiment.

Referring to FIG. 1B, in a possible embodiment, DVR 102 generally comprises one or more components, signified by signal converter 154, that may be used to digitize an analog television signal and convert it into a digital data stream or accept a digital data stream. An example of the internal structure and operation of a DVR is further described in U.S. Pat. No. 6,233,389.

DVR 102 receives broadcast signals from an antenna, from a cable TV system, satellite receiver, etc., via input 152A. Input 152A may comprise one or more tuning modules that allow one or more signals to be received and recorded simultaneously. For example, a TV input stream received by input 152A may take the form of a National Television Standards Committee (NTSC) compliant signal or a Phase Alternating Line (PAL) compliant broadcast signal. For another example, a TV input stream received by input 152A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 152A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 152A and passed to the other modules as if the signals had been delivered via an MPEG-2 private data channel.

Recording module 160 records the incoming data stream by storing the digital data stream on at least one storage facility, signified by storage 164A/164B that is designed to retain segments of the digital data stream. Storage 164A/164B may be one or more non-volatile storage devices (e.g., hard disk, solid state drive, USB external hard drive, USB external memory stick, USB external solid state drive, network accessible storage device, etc.) that are internal 164A and/or external 164B. A signal converter 154 retrieves segments of the data stream, converts the data stream into an analog signal, and then modulates the signal onto a RF carrier, via output 152B, through which the signal is delivered to a standard TV set. Output 152B may alternatively deliver a digital signal to a TV set or video monitor with signal converter 154, converting the data stream into an appropriate digital signal. For example, DVR 102 may utilize a High-Definition Multimedia Interface (HDMI) for sending digital signals to a TV via a HDMI cable.

DVR 102 also includes a communication interface 162, through which the DVR 102 communicates with network 105 via Ethernet, wireless network, modem, or other communications standard. Further, DVR 102 may be integrated into a TV system such that the components described above are housed in a TV set capable of performing the functions of each component of DVR 102.

In another embodiment, DVR 102 generally comprises one or more components necessary to receive, record, store, transfer and playback digital data signals from one or more sources, such as a PC, a DVR, a service provider, or content server. DVR 102 can transfer digital data signals to another DVR, PC, or any other suitably configured device, such as a handheld device or cell phone, etc. DVR 102 may encode or decode digital signals via encoder 156A and decoder 156B into one or more formats for playback, storage or transfer. According to a possible embodiment, encoder 156A produces MPEG streams. According to another embodiment, encoder 156A produces streams that are encoded using a different codec. Decoder 156B decodes the streams encoded by encoder 156A or streams that are stored in the format in which the streams were received using an appropriate decoder. DVR 102 can also encrypt or decrypt digital data signals using encryptor/decryptor 158 for storage, transfer or playback of the digital data signals.

In a possible embodiment, DVR 102 communicates with service provider 104, which provides program guide data, graphical resources such as brand icons and pictures, service information, software programs, advertisements, and other forms of data that enable DVR 102 to operate independently of the service provider 104 to perform autonomous recording functions. Communication between DVR 102 and service provider 104 may use a secure distribution architecture to transfer data between the DVR 102 and the service provider 104 such that both the service data and the user's privacy are protected.

DVR Synchronization with Service Provider by Polling

A possible embodiment of DVR synchronization with service provider 104 by polling may be described with respect to FIG. 1A and FIG. 1B. Storage 164A/164B of DVR 102 comprises program guide data, season pass data, wishlist data, now playing data, to do data (e.g., what programs are scheduled), suggestions data, etc. A season pass is a type of recording that keeps track of episodes of a television series. For example, the service provided by TiVo (TiVo Inc., Alviso, Calif.) records episodes of the television series every week, even when the day or time of a showing of an episode changes. Via a season pass, a user may indicate how many episodes to store and whether or not to store reruns. A wishlist is a list of one or more content items that a user desires to record or schedule to record to the user's DVR when the content item becomes available. The wishlist is specified using any type of information such as an actor's name, director's name, movie title, etc. The DVR 102 records a show or movie that meets the wishlist specification whenever a show or movie is broadcast or is available for download via a network, such as the Internet, intranet, etc. Storage 106 of service provider 104 also comprises a copy of such data for DVR 102. For example, storage 106 comprises one or more databases, which comprise tables that are associated with DVR 102. As well, storage 106 comprises copies of all other DVR clients (e.g., as data stored in tables associated with each of the other DVR clients), which service provider 104 supports and with which service provider 104 communicates (not shown.) DVR 102 periodically establishes a Secure Sockets Layer (SSL) connection to and contacts ("polls") service provider 104 to initiate synchronization between data stored in storage 164A/164B of DVR 102 and data stored in storage 106 of service provider 104. Synchronization between data stored in storage 164A/164B of DVR 102 and data stored in storage 106 of service provider 104 as used herein means causing at least a portion of data stored in storage 164A/164B and at least a portion of data stored in storage 106 to represent the same content. For example, in a possible embodiment, DVR 102 contacts service provider 104 via network 105 to synchronize every fifteen minutes. In a possible embodiment, synchronization is achieved by DVR 102 contacting service provider 104 and sending a subset of local data in storage 164A/164B, e.g., data that reflects updates to the local data stored in storage 164A/164B, to service provider 104 that stores the data on storage 106. In another example, a viewer, from the viewer's PC 110, adds a new season pass for a series, such as The War, to the viewer's collection of season passes. In this example, the viewer, from the viewer's PC 110, adds the new season pass for the series by causing PC 110 to send data related to adding the season pass to service provider 104, which then stores the data in the appropriate table(s) associated with the viewer's DVR 102 in the database on storage 106. When DVR 102 initiates synchronizing data with service provider 104, data reflecting the newly added season pass contained in storage 106 is sent to DVR 102. It should be appreciated that DVR/service provider synchronization is not limited by which element (e.g., DVR 102 or service provider 104) initiates synchronization and sends updated data to the receiving element. For example, DVR 102 may initiate synchronization or service provider 104 may initiate synchronization.

An example DVR/service provider synchronization process is as follows. A user is logged onto the Internet (e.g., network 105) using personal computer 110. For example, the user is navigating the TiVo Central™ Online web page via his browser and, from the TiVo Central™ Online remote scheduling facility, schedules a program to record on the user's DVR 102. The message to record the program gets sent from the web page interface on personal computer 110 to service provider 104. The program information is added to the database tables associated with the user's DVR 102 by service provider 104, e.g., on storage 106 comprising data that represents the schedule of programs for user's DVR 102. The next time that DVR 102 and service provider 104 synchronize data, data reflecting the schedule with the added program is sent by service provider 104 from storage 106 to DVR storage 164A/164B. DVR 102 is thus configured to record the added program according to the user's request.

Instant Message Protocol

Figure 2A:
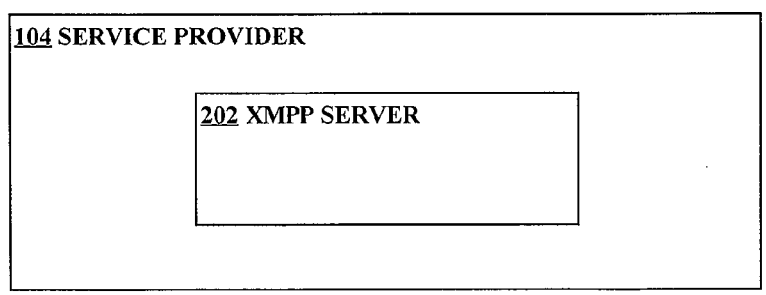
FIG. 2A is a block diagram illustrating service provider comprising an XMPP server internally, according to a possible embodiment.
Figure 2B:
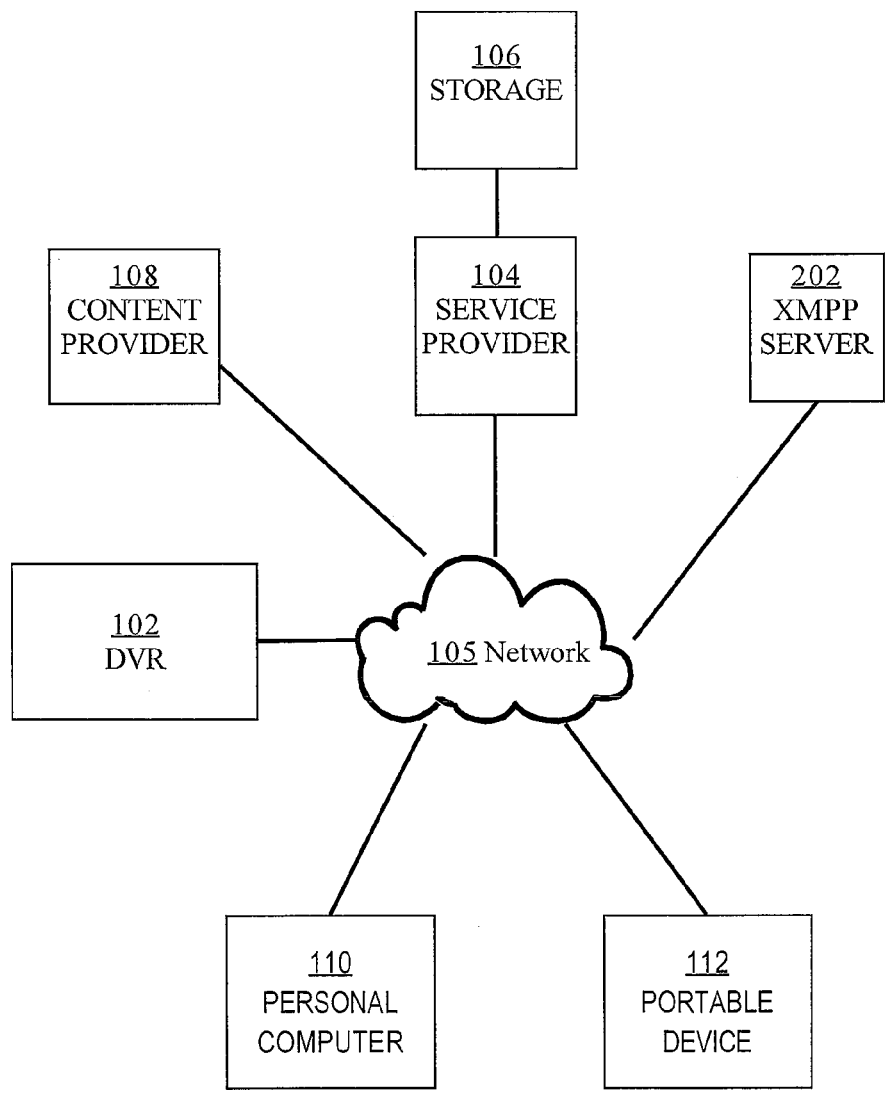
FIG. 2B is a block diagram illustrating XMPP server residing externally to service provider, according to a possible embodiment.

In a possible embodiment, DVR 102, personal computer 110, portable device 112, or any other appropriately configured device, may communicate with service provider 104 on network 105 using a secure client-server instant message protocol to transfer data between DVR 102, personal computer 110, portable device 112, or any other appropriately configured device and service provider 104 such that both the service data and the user's privacy are protected. In a possible embodiment, data may be transferred using secure client-server instant message communications protocol over network 105 via wired, wireless, or any other communication interface. In a possible embodiment, DVR 102 receives and sends instant messages through communication interface 162. As an example, on a cell phone, a user might select a program to be recorded and the request to record the program is sent as an instant message to service provider 104. Instant message communication between DVR 102, personal computer 110, or portable device 112 and service provider 104 may be described with reference to FIG. 2A and FIG. 2B. FIG. 2A is a block diagram of service provider 104 comprising an Extensible Messaging and Presence Protocol (XMPP) server 202 internally. In a possible embodiment, XMPP server 202 is communicatively connected to network 105 and external to service provider 104, as shown in FIG. 2B. It should be appreciated that in a possible embodiment, any system configured for instant message communications protocol may be contemplated and that any embodiment described herein using XMPP is meant by way of example and is not meant to be limiting. For example AOL Instant Messenger (AIM®), Microsoft's Windows Live, ICQ®, or Short Messaging Services (SMS) are each a system that may be used for instant message communications protocol in accordance with one or more embodiments. In a possible embodiment, commands from any of DVR 102, personal computer 110, or portable device 112 are sent via network 105 to service provider 104 as instant messages. After receipt of such instant messages, service provider 104 updates appropriate database tables in storage 106 that are associated with the user associated with the command. As an example, in a possible embodiment, after receipt of one or more instant messages containing information relating to a particular update to a user's DVR, service provider 104 updates appropriate database objects in central site database 100, as described in the commonly owned U.S. Pat. No. 6,728,713, titled, "Distributed Database Management System," dated Apr. 27, 2004, which is incorporated herein in its entirety as if fully set forth herein. It should be appreciated that such configurations are by way of example only and are not meant to be limiting.

In a possible embodiment, XMPP is an open source protocol for real-time extensible instant messaging (IM) over a network as well as presence information, such as used for buddy lists. XMPP is based on open standards, similar to email. Similar to a user in an open email environment, a user in an open XMPP environment with a domain name and a suitable Internet connection may run an XMPP server and communicate directly with users on other XMPP servers. An example client XMPP application is Google Talk. Google Talk is a Windows application for Voice over IP and instant messaging, offered by Google, Mountain View, Calif.

An example XMPP message delivery process from UserA to UserB is as follows. UserA sends a message intended for UserB to UserA's XMPP server. If UserB is blocked on UserA's server, then the message is dropped. Otherwise, UserA's XMPP server opens a connection to UserB's XMPP server. A possible embodiment of the opened connection may include obtaining authorization and obtaining an encrypted connection. After the connection is established, UserB's XMPP server checks if UserA is blocked on UserB's XMPP server. If UserA is blocked on UserB's XMPP server, the message is dropped. In a possible embodiment, if UserB is not presently connected to UserB's XMPP server, the message is stored for later delivery. It should be appreciated that other options apply, such as dropping the message. In a possible embodiment, if UserB is presently connected to UserB's XMPP server, the message is delivered to UserB. It should be appreciated that in a possible embodiment, UserA's server and UserB's server are the same server. For instance, UserA sends instant messages to UserB and receives instant messages from UserB by sending messages to and receiving messages from an XMPP server and UserB sends instant messages to UserA and receives messages from UserA by sending messages to and receiving messages from the XMPP server.

Further details on example structure and functionality of XMPP may be found in The Internet Society's "Request For Comment" (RFC) documents RFC3920, "Extensible Messaging and Presence Protocol: Core" and RFC3921, "Extensible Messaging and Presence Protocol: Instant Messaging and Presence."

Instant Message Synchronization

In a possible embodiment, DVR 102 is an instant messaging client and hosts an instant message client application. DVR 102 attempts to maintain an instant messaging connection with instant message XMPP server 202 at all times. Service provider 104 is also an instant messaging client and hosts an instant message client application. As well, service provider 104 attempts to maintain an instant messaging connection with instant message XMPP server 202 at all times. In a possible embodiment, DVR 202, XMPP server 202, and service provider 104 communicate according to open standard XMPP protocol, e.g., as described above. In a possible embodiment, service provider 104 comprises related software that enables service provider 104 to communicate with storage 106. It should be appreciated that in certain contexts herein, references to service provider 104 are used in the collective sense and are meant to include reference to the related software that manages storage 106.

Figure 3A:
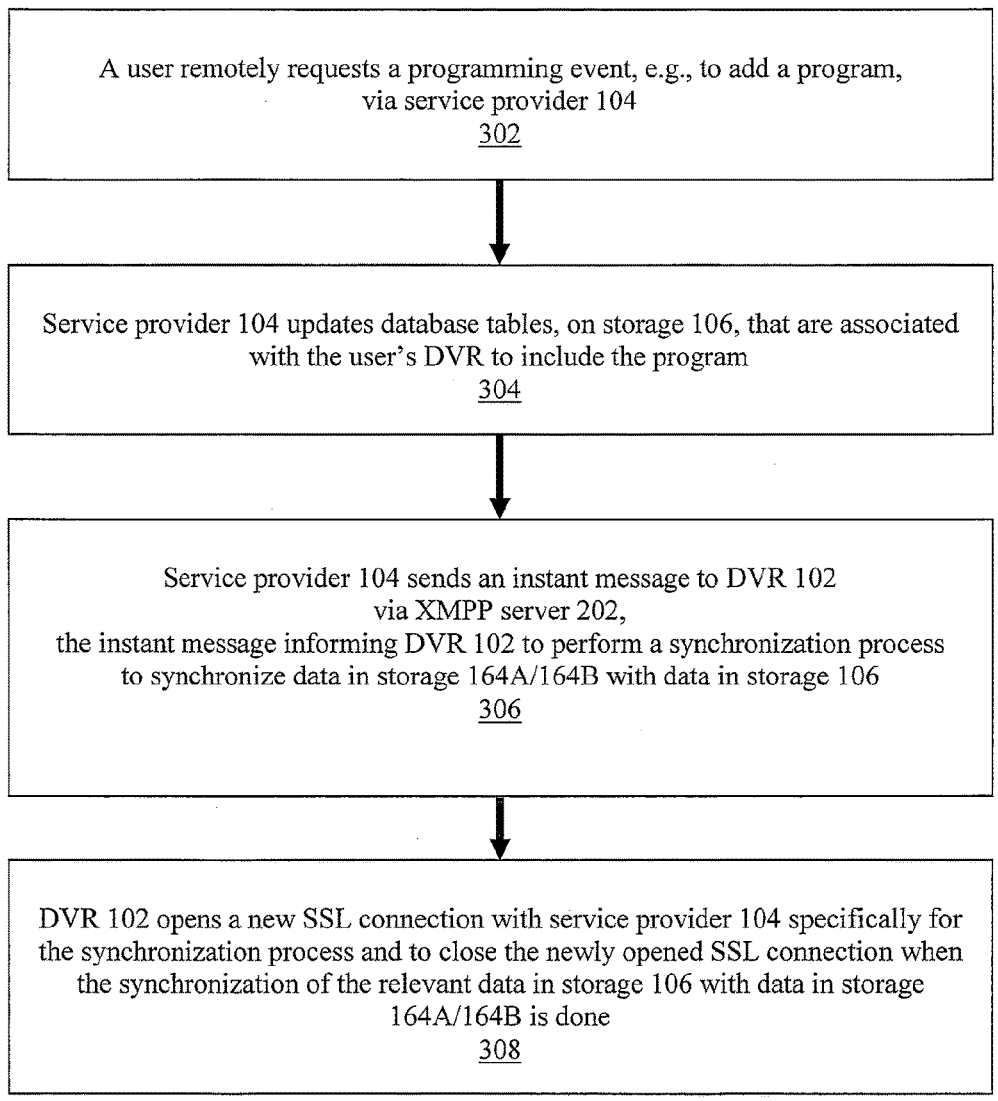
FIG. 3A is a flow diagram showing an example DVR/service provider synchronization process flow, according to a possible embodiment.

A possible embodiment of instant message synchronization may be described with reference to FIG. 3A. FIG. 3A is a flow diagram showing an example DVR/service provider synchronization process flow. This example synchronization process flow begins with a user remotely requesting a programming event, e.g., to add a program, via service provider 104 (Step 302.) For example, PC 110 may request to add a program to the user's schedule of recordings for DVR 102. For example, through PC 110 the user may remotely add a program to record using TiVo Central™ Online through service provider 104. Service provider 104 updates database tables on storage 106 that are associated with the user's DVR to include the program (Step 304.) As well, service provider 104 sends an instant message to DVR 102 via XMPP server 202 (Step 306.) It should be appreciated that, in a possible embodiment, DVR 102 attempts to maintain the connection to XMPP server 202 at all times, reconnecting automatically whenever the connection drops. Similarly, it should be appreciated that, in a possible embodiment, service provider 104 attempts to maintain the connection to XMPP server 202 at all times, reconnecting automatically whenever the connection drops. In either case, when the connection to XMPP server 202 is not up for any reason, the instant message is discarded. In the example, the instant message informs DVR 102 that a change has been made to the database tables that are associated with the user's DVR in storage 106 and requests that DVR 102 synchronize data in storage 164A/164B with data in storage 106. In a possible embodiment, the notification causes DVR 102 to open a new SSL connection with service provider 104 specifically for the synchronization process and to close the newly opened SSL connection when the synchronization of the relevant data in storage 106 with data in storage 164A/164B is done (Step 308.) It should be appreciated that certain details in the example are by way of illustration only and are not meant to be limiting. As an example, while a remote user requests a change, the request for change may be sent from any configurable device, such as portable device 112.

Figure 3B:
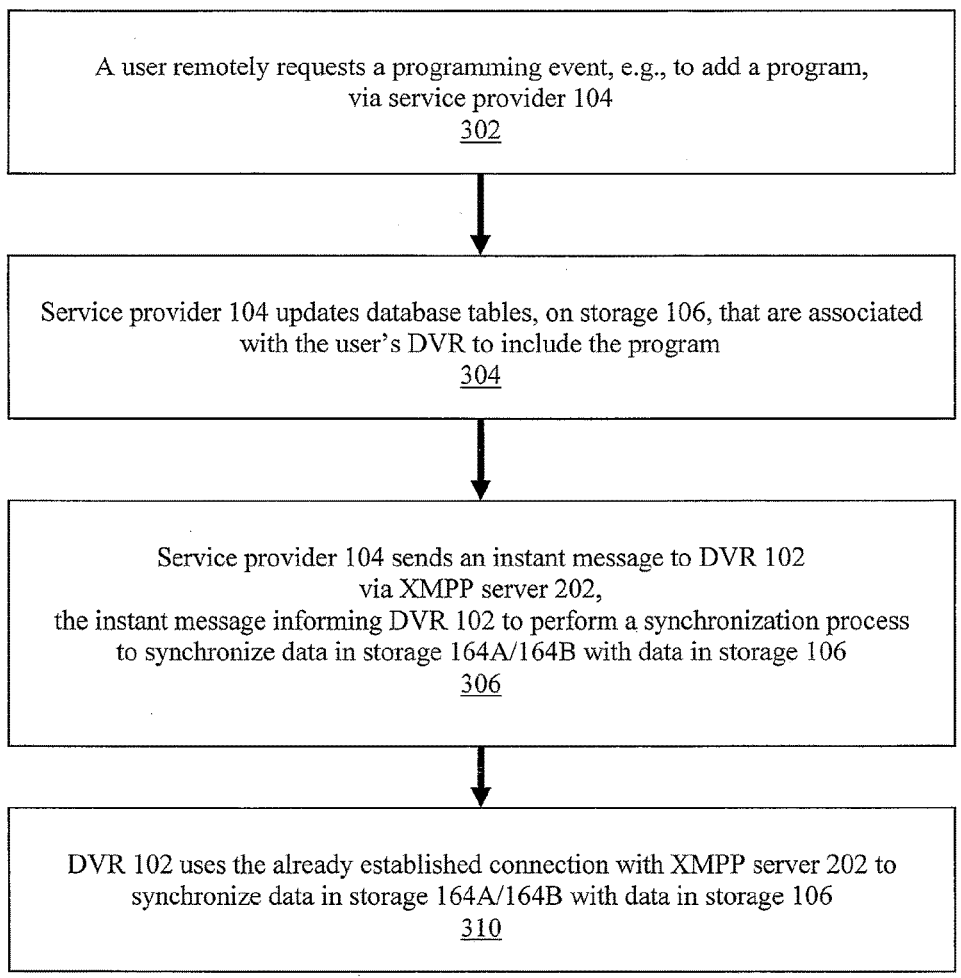
FIG. 3B is a flow diagram showing an example DVR/service provider synchronization process flow, according to a possible embodiment.

Another embodiment of DVR/service provider synchronization may be described with reference to FIG. 3B. FIG. 3B is a flow diagram showing an example DVR/service provider synchronization process flow that is similar to FIG. 3A, however with a different last step. As in FIG. 3A, the example synchronization process flow of FIG. 3B begins with a user remotely requesting a programming event, e.g., to add a program, via service provider 104 (Step 302.) For example, PC 110 requests the service to add a program to the user's schedule of recordings for DVR 102. For example, through PC 110 the user may remotely add a program using TiVo Central™ Online through service provider 104. Service provider 104 updates database tables on storage 106 that are associated with the user's DVR to include the program (Step 304.) As well, service provider 104 sends an instant message to DVR 102 via XMPP server 202 (Step 306.) It should be appreciated that, in a possible embodiment, DVR 102 attempts to maintain the connection to XMPP server 202 at all times, reconnecting automatically whenever the connection drops. Similarly, it should be appreciated that, in a possible embodiment, service provider 104 attempts to maintain the connection to XMPP server 202 at all times, reconnecting automatically whenever the connection drops. In either case, when the connection to XMPP server 202 is not up for any reason, the instant message is discarded. In the example, the instant message informs DVR 102 that a change has been made to the database tables that are associated with the user's DVR in storage 106 and requests that DVR 102 synchronize data in storage 164A/164B with data in storage 106. Responsive to the message, DVR 102 uses the already established connection with XMPP server 202 to pass and/or receive the synchronization data to synchronize data in storage 164A/164B with data in storage 106 (Step 310.) It should be appreciated that certain details in the example are by way of illustration only and are not meant to be limiting. For instance, while, in the example, a remote user requests a change from PC 110, in another possible embodiment, the request for change may be sent from any configurable device, such as portable device 112. It should be appreciated that this approach allows for fast updates of DVR 102. A user may be able to request to record a multimedia content a minute or two before the multimedia content begins and DVR 102 may be updated and record the multimedia content without missing any of the content material.

It should be appreciated that client-server instant message protocol in a DVR environment is not limited to synchronizing schedule-related and recording-related data. Indeed, any type of data stored in storage 106 of service provider 104 may be synchronized with data stored in DVR storage 164A/164B, such as software, electronic program guide data, advertisements, multimedia content, etc. As well, any type of data stored in DVR storage 164A/164B may be synchronized with data stored in storage 106 of service provider 104.

As well, through an instant message connection, data reflecting any type of activity from any client may be sent to the service provider storage on a real-time basis. The type of and use of such gathered data is limitless. For example, the data may be aggregated and analyzed for marketing or towards providing better customer service. As another example, data gathered for a particular user may be used to initiate a customized or targeted process for that particular user, and so forth.

Real-Time Direct Communication Between Device and DVR

In a possible embodiment, a device, such as, for example, portable device 112, is in direct communication, via an instant message server, with a DVR, such as DVR 102. In a possible embodiment, the device ("direct device") is configured with customized user interface DVR software ("DVR UI") that allows the user to program the user's DVR from the direct device as though the user is operating the user's DVR at home, the office, or any place where the DVR is located. Further, the direct device hosts an instant message client application such that the direct device is an instant messaging client. This approach allows for fast updates to the user's DVR from a direct device, such as a cell phone.

Figure 3C:
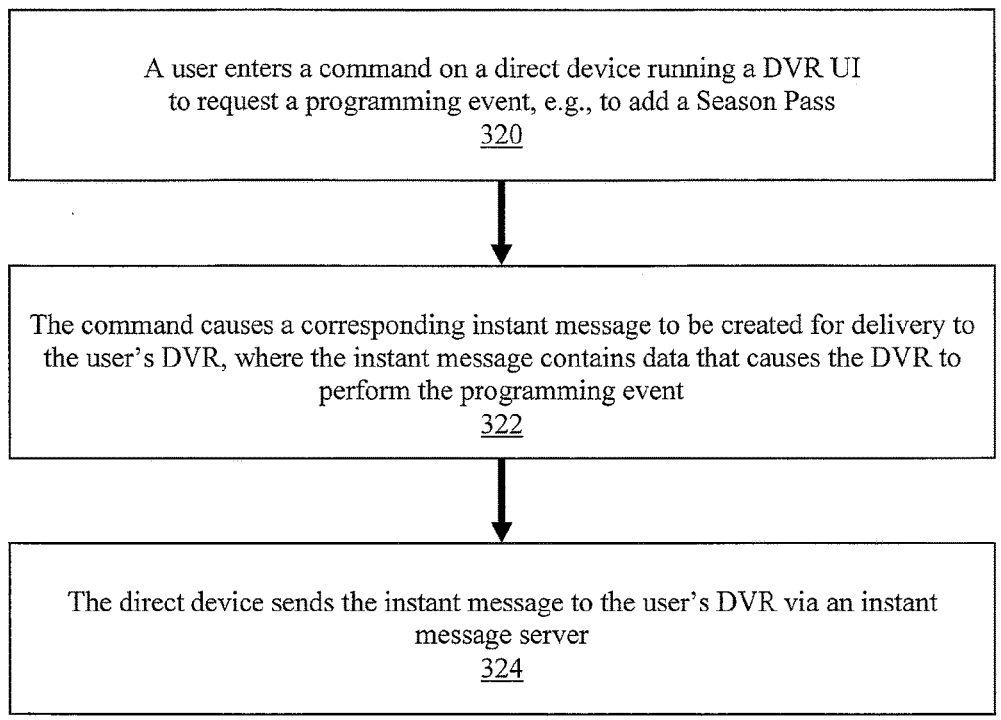
FIG. 3C is a flow diagram showing an example of direct communication from a device to a DVR, according to a possible embodiment.

A possible embodiment can be described with reference to FIG. 3C, a flow diagram showing an example of direct communication from a device to a DVR. In an example implementation, a user desires to request a programming event, such as to add a season pass for a particular television program, from the user's cell phone. In a possible embodiment, the user opens his cell phone and from the cell phone launches his copy of the DVR UI. While the DVR UI is running, the user navigates to the appropriate screen and enters a command to add the season pass (Step 320.) After receiving the command, the DVR UI causes a corresponding instant message to be created that is to be delivered to the user's DVR (Step 322.) In a possible embodiment, the DVR UI generates the instant message and provides it to the instant message client application or, in another possible embodiment, the instant message client application generates the instant message. The instant message contains data that causes the user's DVR to add the season pass, for example, as though the user was at home and operating his DVR. It should be appreciated that the particular configurations described above are by way of example only and are not meant to be limiting.

In a possible embodiment, after the instant message is generated, the direct device uses an already established connection with an instant message server and sends the instant message to the instant message server to be delivered to the user's DVR (Step 324.) In another possible embodiment, the direct device opens a new connection to the instant message server and sends the instant message to the instant message server to be delivered to the user's DVR (Step 324.) In a possible embodiment, after the instant message is sent to the instant message server, the direct device closes the connection to the instant message server.

In a possible embodiment, the user's DVR maintains a connection to the instant message server at all times and receives the instant message originally sent by the direct device via the already established connection to the instant message server.

In a possible embodiment, the direct device or the instant message server retries sending the instant message to the user's DVR until the delivery is successful. In a possible embodiment, the direct device or the instant message server is notified when the instant message has been successfully delivered to the user's DVR. For example, the direct device or the instant message server may receive an instant message from the user's DVR indicating that the delivery of the instant message was successful. In another possible embodiment, the direct device or the instant message server stores a copy of the instant message or stores related data that may be used for generating a new instant message for delivery to the user's DVR. Then, when delivery of the instant message fails, the direct device or the instant message server may send another instant message by using the stored copy or the newly generated instant message. For example, when after a specified length of time the direct device or the instant message server does not receive notification that the delivery of the instant message was successful, the copy of the instant message or the newly generated instant message is subsequently sent for delivery to the user's DVR. In another possible embodiment, the direct device or the instant message server tries to resend the instant message or the newly generated instant message on a periodic basis until a notification of successful delivery is received or until a specified retry limit is reached. For example, the direct device or the instant message server may resend the instant message every second. As another example, the direct device or the instant message server may try to resend the instant message 20 times, after which the process that retries sending the instant message terminates. In another possible embodiment, when the retry limit is reached, the direct device receives a notification message indicating that the attempt to deliver the instant message failed. In a possible embodiment, when the retry limit is reached, the DVR UI displays on the display of the direct device, a message indicating that the delivery failed or that the user's request for the programming event failed. For example, the user's DVR UI may display a message indicating that the attempt to add the season pass failed. In another possible embodiment, when the instant message cannot be delivered to the user's DVR (e.g., the user's DVR connection to the instant message server has been dropped), the instant message is discarded.

In a possible embodiment, after receiving the instant message containing programming event data, such as adding the season pass, the user's DVR performs the appropriate operation, such as adding the season pass, as if the user had entered the command at the user's DVR. Data reflecting the programming event is stored in storage 164A/164B. Then, storage 106 of service provider 104 is updated with the information stored in 164A/164B, including, for example, the added season pass from the example, via any of the synchronization processes described above.

Scalability and Robustness

In a possible embodiment, the DVR attempts to maintain an SSL connection with an XMPP server at all times, reconnecting whenever the connection is dropped. Because the DVR maintains the SSL connection with the XMPP server, the DVR has the capability to use instant messaging at all times, except during those short intervals when the connection is temporarily dropped. For example, the DVR may employ an already established connection with the XMPP server to perform the synchronization with the service provider. Thus, the DVR using the established connection to perform synchronization provides scalability.

In another embodiment, one or more XMPP servers are configured not to store messages that are sent to any of the one or more XMPP servers. For example, an XMPP server receives an XMPP message and passes the XMPP message on to a recipient, such as the DVR, without using additional XMPP server resources for storing the message. Because the one or more XMPP servers may not need to use additional resources to store XMPP messages, more XMPP server resources may be used at a given time for processing more messages, thus providing greater scalability.

In a possible embodiment, DVR/service provider synchronization via instant messaging is robust because the DVR and service provider automatically reconnect after any connection failures during the synchronization process.

In another embodiment, DVR/service provider synchronization is rendered robust by a configuration that uses a combination of DVR/service provider synchronization by polling and DVR/service provider synchronization by instant messaging. For example, an administrator may set DVR/service provider synchronization by polling to operate every twenty-four hours, while DVR/service provider synchronization by instant messaging is operable as well. The combination of synchronization by polling and synchronization by instant messaging renders a robust synchronization feature. For example, suppose that an XMPP server crashes at the time that the XMPP server is attempting to send a message to a DVR, e.g., a request to synchronize, and that the crash causes the sending of the message to fail. In a possible embodiment, the DVR may be updated from the synchronization by the polling process, possibly at a later time. Thus, synchronization is successful and robust even in a case, which may be rare, when an XMPP message is lost.

Hardware Overview

Figure 4:
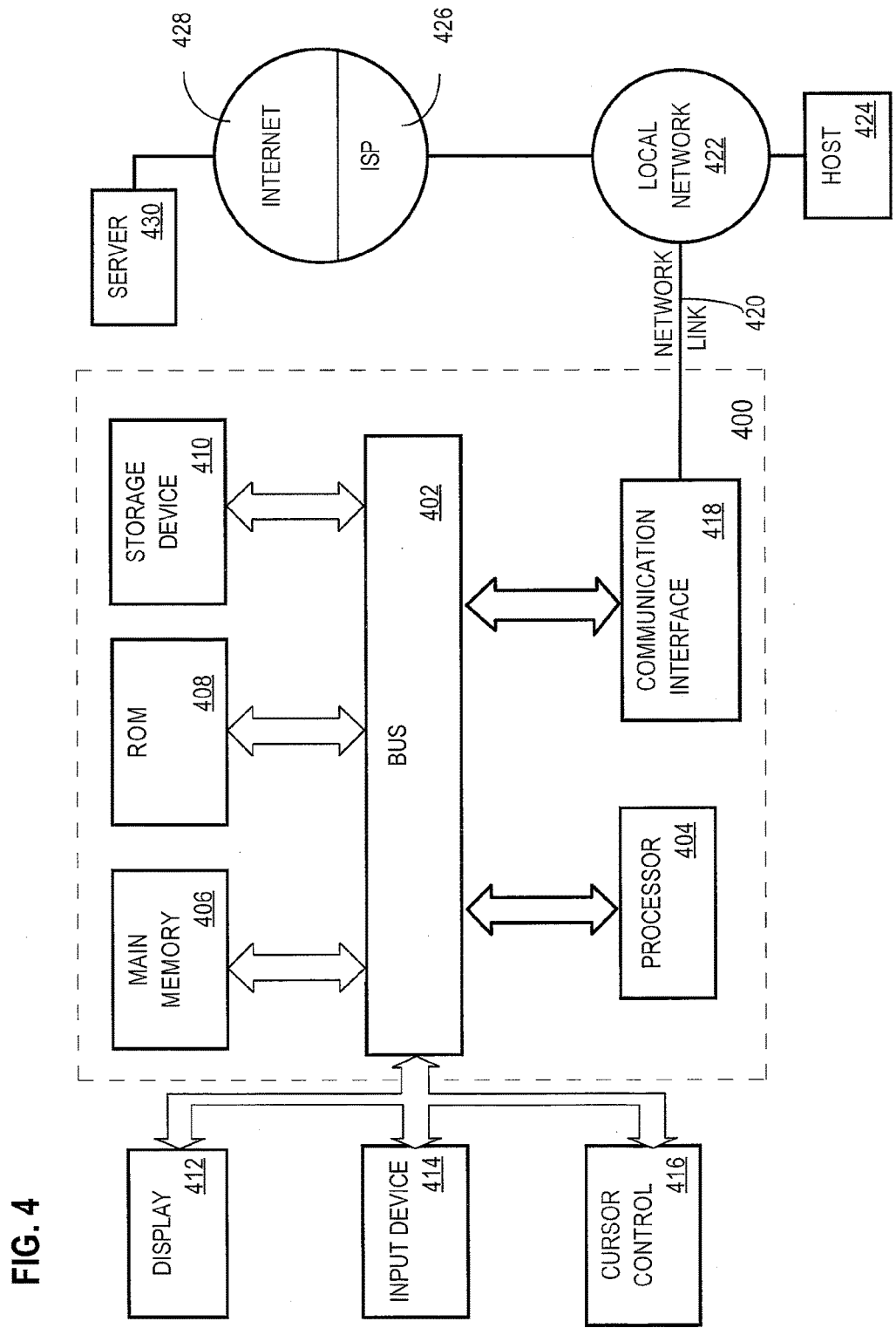
FIG. 4 is a block diagram that illustrates a computer system upon which a possible embodiment may be implemented.

FIG. 4 is a block diagram that illustrates a computer system 400 upon which a possible embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for selecting a frame of a multi-frame video program for display in accordance with a selected trick play mode of a DVR. According to a possible embodiment of the invention, selecting a frame of a multi-frame video program for display in accordance with a selected trick play mode of a DVR is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   receiving, at a device, a command to add a season pass to record episodes of a series on a media recording device;
   in response to receiving the command, the device generating an instant message for delivery to the media recording device, the instant message containing data that causes the media recording device to add the season pass;
   sending, by the device, the instant message for delivery to the media recording device via an instant message server;
   after a specified length of time from the sending of the instant message, determining by the device, whether a notification message was received from the media recording device during the specified length of time, the notification message indicating whether the media recording device has received the instant message to add the season pass; and
   responsive to determining the notification message was not received during the specified length of time, resending the instant message.

2. The method as recited in claim 1, wherein the device maintains a connection with the instant message server.

3. The method as recited in claim 1, further comprising:
   opening, by the device, a connection with the instant message server, prior to the server sends the instant message for delivery to the media recording device.

4. The method as recited in claim 1, further comprising:
   receiving, by the device or the instant message server, a notification message when the delivery is successful.

5. The method as recited in claim 1, further comprising:
   resending, by the device or the instant message server, the instant message until the delivery is successful or until a retry limit is reached.

6. The method as recited in claim 5, wherein the instant message is resent on a periodic basis.

7. The method as recited in claim 5, further comprising:
   in response to the retry limit being reached, the device receiving a notification message indicating that the delivery failed.

8. The method as recited in claim 5, further comprising:
   in response to the retry limit being reached, displaying on a display of the device, a message indicating that the programming event failed.

9. The method as recited in claim 1, wherein the device is any of: a personal computer, a portable device, or a server.

10. A non-transitory computer-readable storage medium storing one or more sequences of instructions, which when executed by one or more processors, causes the one or more processors to carry out the steps of:
    receiving, at a device, a command to add a season pass to record episodes of a series on a media recording device;
    in response to receiving the command, the device generating an instant message for delivery to the media recording device, the instant message containing data that causes the media recording device to add the season pass;
    sending, by the device, the instant message for delivery to the media recording device via an instant message server;
    after a specified length of time from the sending of the instant message, determining by the device, whether a notification message was received from the media recording device during the specified length of time, the notification message indicating whether the media recording device has received the instant message to add the season pass; and
    responsive to determining the notification message was not received during the specified length of time, resending the instant message.

11. The non-transitory computer-readable storage medium as recited in claim 10, wherein the instructions further comprise instructions for the device maintaining a connection with the instant message server.

12. The non-transitory computer-readable storage medium as recited in claim 10, wherein the instructions further comprise instructions for:
opening, by the device, a connection with the instant message server, prior to the server sends the instant message for delivery to the media recording device.

13. The non-transitory computer-readable storage medium as recited in claim 10, wherein the instructions further comprise instructions for:
receiving, by the device or the instant message server, a notification message when the delivery is successful.

14. The non-transitory computer-readable storage medium as recited in claim 10, wherein the instructions further comprise instructions for:
resending, by the device or the instant message server, the instant message until the delivery is successful or until a retry limit is reached.

15. The non-transitory computer-readable storage medium as recited in claim 14, wherein the instructions further comprise instructions for resending the instant message on a periodic basis.

16. The non-transitory computer-readable storage medium as recited in claim 14, wherein the instructions further comprise instructions for:
receiving, by the device, a notification message indicating that the delivery failed, in response to the retry limit being reached.

17. The non-transitory computer-readable storage medium as recited in claim 14, wherein the instructions further comprise instructions for:
displaying on a display of the device, a message indicating that the programming event failed, in response to the retry limit being reached.

18. The non-transitory computer-readable storage medium as recited in claim 10, wherein the device is any of: a personal computer, a portable device, or a server.

19. An apparatus, comprising:
a receiving module, at least partly implemented in hardware, that receives at a device, a command to add a season pass to record episodes of a series on a media recording device;
an instant message generation module, at least partly implemented in hardware, that generates, by the device, an instant message for delivery to the media recording device, the instant message containing data that causes the media recording device to add the season pass, in response to receiving the command;
a sending module, at least partly implemented in hardware, that sends, by the device, the instant message for delivery to the media recording device via an instant message server;
a determination module, at least partly implemented in hardware, that after a specified length of time from the sending of the instant message, determines, by the device, whether a notification message was received from the media recording device during the specified length of time, the notification message indicating whether the media recording device has received the instant message to add the season pass, and responsive to determining the notification message was not received during the specified length of time, resending the instant message.

20. The apparatus as recited in claim 19, wherein the device is configured to maintain a connection with the instant message server.

21. The apparatus as recited in claim 19, further comprising:
a connecting module, at least partly implemented in hardware, that opens, by the device, a connection to the instant message server, prior to the server sends the instant message for delivery to the media recording device.

22. The apparatus as recited in claim 19, further comprising:
a notification receiving module, at least partly implemented in hardware, that receives by the device or the instant message server, a notification message when the delivery is successful.

23. The apparatus as recited in claim 19, further comprising:
a resending module, at least partly implemented in hardware, that resends, by the device or the instant message server, the instant message until the delivery is successful or until a retry limit is reached.

24. The apparatus as recited in claim 23, wherein the instant message is resent on a periodic basis.

25. The apparatus as recited in claim 23, further comprising:
a notification receiving module, at least partly implemented in hardware, that receives by the device a notification message indicating that the delivery failed, in response to the retry limit being reached.

26. The apparatus as recited in claim 23, further comprising:
a display of the device that displays a message indicating that the programming event failed, in response to the retry limit being reached.

27. The apparatus as recited in claim 19, wherein the device is any of: a personal computer, a portable device, or a server.

* * * * *